L. M. Olden.
Beehive.

No. 71,405. Patented Nov. 26, 1867.

Witnesses
Edw Schafer
John Kaydon

Inventor.
Lucius M. Olden
by his agents
Mason, Fenwick & Lawrence

United States Patent Office.

LUCIUS M. OLDEN, OF PANA, ILLINOIS.

Letters Patent No. 71,405, dated November 26, 1867.

IMPROVEMENT IN BEE-HIVES.

*The Schedule referred to in these Letters Patent and making part of the same.*

TO ALL WHOM IT MAY CONCERN:

Be it known that I, LUCIUS M. OLDEN, of Pana, in the county of Christian, and State of Illinois, have invented a new and improved Bee-Hive; and I do hereby declare that the following is a full, clear, and exact description thereof, reference being had to the accompanying drawings, making a part of this specification, in which—

Figure 1:
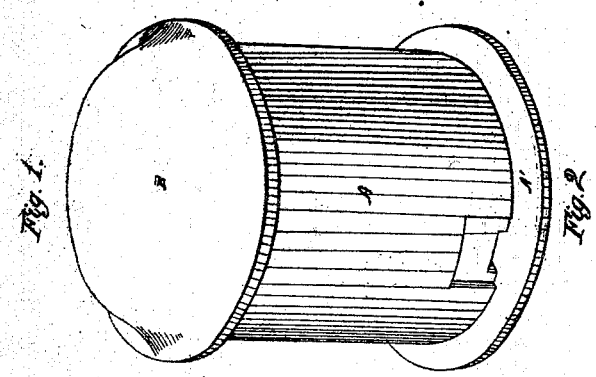
Figure 2:
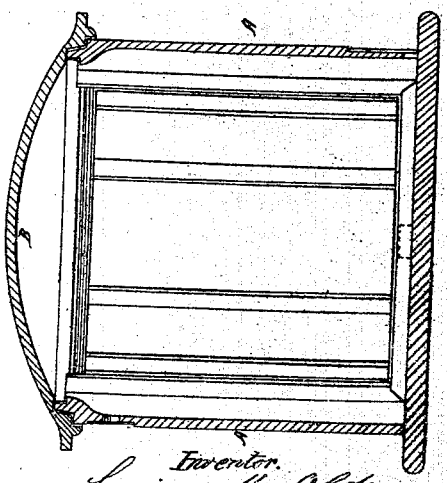

Figure 1 is a perspective view of my improved cylindrical bee-hive.
Figure 2 is a diametrical section through this hive.
Figures 3, 4, 5, and 6 are views of my improved rectangular bee-hives.
Similar letters of reference indicate corresponding parts in the several figures.

The object of this invention is to protect bees from the ravages of the miller-moth by the construction of hives of a substance which will resist all attempts of the moth intrenching itself in the walls of the hives, and which will also afford ample protection to the bees from extremes of temperature during winter and summer, as will be hereinafter described.

To enable others skilled in the art to understand my invention, I will describe its construction and operation.

In the accompanying drawings, figs. 1 and 2, A represents the cylindrical body of the hive, which is constructed with a flat bottom, A', and a removable concavo-convex top, B. The upper edge of the cylindrical body A is rabbeted, as shown in fig. 2, so that the cover B will fit snugly in place. Within this hive I arrange the frames for receiving the honey-comb, and construct them of wood or other suitable material, with their outer edges covered with thin sheet metal, as shown. Any suitable form of comb-frame may be employed in the hives, and, whatever form is employed, it should be provided with the metal protection described. The recesses and elevations necessary for keeping the frames in their proper places in the hive will be formed as shown in the drawings, or in any other suitable manner. I construct the cylindrical body, the top, and the bottom of this hive, shown in fig. 1, of dried or burnt earth, after the manner of making earthenware or stoneware. The external surface of the hive will be properly glazed, so as to exclude water and dampness from the interior thereof, and to preserve the hive from destruction. I have discovered that the miller-moth will not infest bee-hives unless it can intrench itself into the walls thereof, to prevent which I construct my hives of burnt clay or stoneware, which will resist all attempts of the moths to intrench themselves, and also prevent the bees from being injured by the extremes of temperature during winter and summer. The burnt clay or stoneware being a good non-conductor of heat and cold, it will keep the interior of the hive always pleasant and comfortable for the bees.

Figure 5:
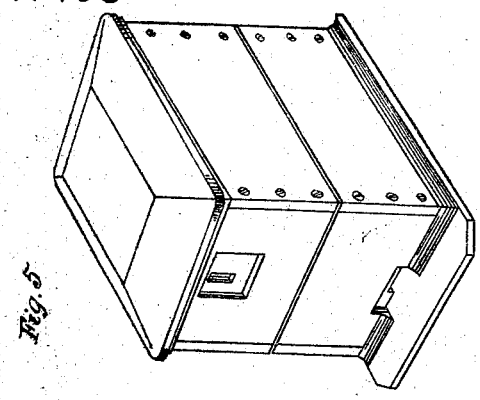
Figure 6:
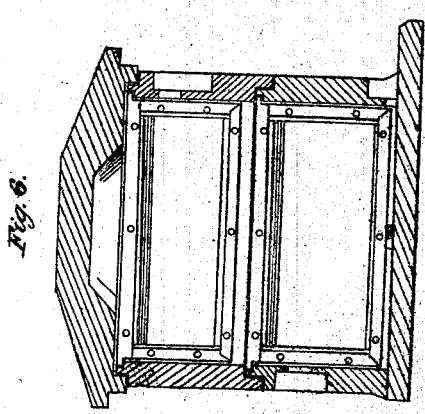
Figure 3:
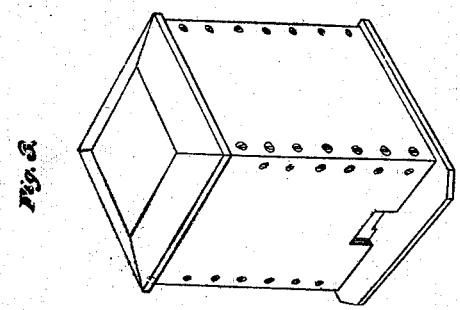
Figure 4:
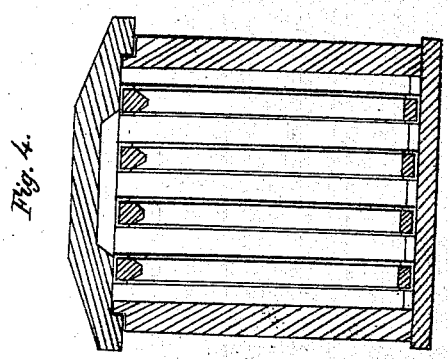

I do not confine my invention to a cylindrical hive, as rectangular or other shaped hives may be made of the substance described. Figs. 3 and 4 show a rectangular hive having one set of comb-frames, and figs. 5 and 6 show a rectangular sectional hive, with two sets of comb-frames arranged within it. This last-mentioned hive is made in two horizontal sections, so that the upper section can be removed for obtaining access to the lower comb-frames. But my invention is limited to earthen or stoneware hives, which are adapted for supporting comb-frames, as described and shown.

I am aware that earthenware vessels for bees to store honey in are described in the book entitled the Honey-Bee; therefore I do not claim broadly the use of earthenware receptacles for honey; but what I do claim as my invention, and desire to secure by Letters Patent, is—

The baked earthenware or stoneware bee-hive, furnished with comb-frames, and constructed substantially in the manner herein described and shown, as an improved article of manufacture.

LUCIUS M. OLDEN.

Witnesses:
S. D. HIGGENS,
S. V. ROSEBERRY.